United States Patent [19]

Carrott

[11] Patent Number: 4,882,193

[45] Date of Patent: Nov. 21, 1989

[54] PROCESS FOR PRODUCING A LOW FAT CONTENT EGG PRODUCT

[75] Inventor: Richard F. Carrott, Moorpark, Calif.

[73] Assignee: The Careau Group, Moorpark, Calif.

[21] Appl. No.: 221,965

[22] Filed: Jul. 25, 1988

[51] Int. Cl.[4] .............................................. A23L 1/32
[52] U.S. Cl. ..................................... 426/614; 426/602
[58] Field of Search ................................. 426/614, 602

[56] References Cited

U.S. PATENT DOCUMENTS

| | | | |
|---|---|---|---|
| 3,843,811 | 10/1974 | Seeley | 426/614 |
| 4,234,619 | 11/1980 | Yano | 426/385 |
| 4,333,959 | 6/1982 | Bracco | 426/614 |
| 4,409,249 | 10/1983 | Forkner | 426/614 |
| 4,675,202 | 6/1987 | Wenger | 426/614 |

FOREIGN PATENT DOCUMENTS

| | | | |
|---|---|---|---|
| 898056 | 4/1972 | Canada | 426/614 |
| 116659 | 7/1983 | Japan | 426/614 |
| 392789 | 8/1932 | United Kingdom | 426/614 |
| 1208666 | 5/1968 | United Kingdom | 426/614 |

Primary Examiner—Carolyn Paden
Attorney, Agent, or Firm—Robert J. Schaap

[57] ABSTRACT

A process for producing a low fat content egg product is disclosed which relies upon the production of eggs having a yolk with a dark color, such as a dark yellow or a dark orange-yellow color content and which eggs also have a strong egg taste. The desired taste and color of the yoke of the egg is achieved by adjusting the feed to the chickens which produce the eggs. The contents of the egg which is removed from the shell, that is the yolk and egg white (albumen) are separated and the yolk is mixed with a substantial quantity of albumen to, in effect, dilute the yolk of the egg. The ratio of albumen to yolk is based upon that required to dilute the yolk to render an egg product having a normal yellow egg color and a normal egg taste. However, in view of the fact that there is substantially less yolk content there is also substantially less fat content including, but not limited to cholesterol content.

12 Claims, 1 Drawing Sheet

PROCESS FOR PRODUCING A LOW FAT CONTENT EGG PRODUCT

BACKGROUND OF THE INVENTION

1. Field of the Invention.

This invention relates in general to certain new and useful improvements in low fat content egg products and processes for producing same, and more particularly, to a low fat content egg product and process therefore which rely upon a substantial dilution of the yolk content of the egg with albumen to thereby reduce the fat content proportionally to the amount of added albumen.

2. Brief Description of the Prior Art.

In relatively recent years, the medical community has become aware of the fact that various fats and products which result in blood fats in a human body are precursors of, or otherwise can lead to arterial blockage. This arterial blockage is one of the prime cause of myocardial infarctions and strokes. As a result, the public in general, and particularly, high risk persons in the public, have been advised to substantially reduce and control cholesterol and other fat intake.

Due to the fact that eggs and most egg products contain a high percentage of cholesterol, there is a resultant concern over the consumption of eggs and egg products. While a substantial percentage of the cholesterol found in eggs is high density cholesterol and which is not harmful, but actually beneficial, and a smaller percentage of low density cholesterol, the public in general, even including the medical community, has associated eggs with a high risk food product. Accordingly, many people who were accustomed to eggs as a staple article for breakfast and ingredients in other food products have substantially reduced, if not completely eliminated, the consumption of eggs or foods containing eggs. As a result, there is a need for an egg product which has a low fat content including low cholesterol fat content. Moreover, there is a need to obtain a low fat content egg product and a process for producing same and which egg product can be produced at a relatively low cost.

OBJECTS OF THE INVENTION

It is, therefore, one of the primary objects of the present invention to provide a low fat content egg product which is comprised of a small yolk content and a substantial albumen content and which thereby results in low fat content.

It is another object of the present invention to provide a low fat content egg product of the type stated in which the color and the taste of the egg can be adjusted to suit a particular demand.

It is a further object of the present invention to provide a low fat content egg product in which the amount of fat including, but not limited to cholesterol content can be adjusted in accordance with a particular demand therefore.

It is an additional object of the present invention to provide a process for producing a low fat content egg product and which relies upon dilution of the yolk of the egg product with a substantial amount of albumen to thereby reduce the amount of fat content contained in the product.

It is another salient object of the present invention to provide a process for producing a low fat content egg product in which the amount of fat in the egg product and the color of the egg product and the taste of the egg product can be adjusted to conform to particular specifications therefore.

With the above and other objects in view, my invention resides in the novel features of form, construction, arrangement and combination of components and use of the steps in the process which embody the invention.

BRIEF SUMMARY OF THE INVENTION

The invention relates in general to a low fat content egg product and the process for producing same and which relies primarily upon the dilution of the yolk of eggs with a substantial amount of albumen.

It has been recognized and well established that essentially all of the fats in an egg ar found in the yolk This includes, but is not limited to, both low density and high density cholesterol fats. It is desirable, in accordance with the present invention, to obtain an egg product which has the appearance of a normal egg and the taste of a normal egg but with substantially reduced fat and cholesterol content.

It has also been well established that selection of certain feeds will result in variation in the color and taste of an egg produced by a hen. In accordance with the present invention, chickens are fed a certain type of feed which results in eggs having a somewhat dark yellow or dark red-yellow content. Eggs of this type also inherently have a much stronger than normal egg taste.

The eggs which are produced having yolks of the desired overly rich, that is darker than normal yellow color, and containing red hues therein, and the much stronger than normal than egg taste are then cracked, that is opened, and the yolk and egg white (primarily albumen) is removed from the shells. The yolks are generally in-tact and therefore easily separated from the albumen. The yolks are then separated and introduced into a suitable mixing container.

A desired amount of egg white is then introduced into the egg yolks in order to produce an egg product of diluted color and diluted taste. The strength of the taste and the darkness of the color will vary inversely proportionally to the amount of albumen added. Thus, if a substantial quantity of albumen is added, the overly strong taste in the eggs is substantially reduced. In like manner, by adding a substantial amount of albumen, the overly rich dark yellow and perhaps yellow-red colored yolk is also blended to a much more normal yellow color. Thus, the white albumen substantially dilutes the dark color of the yolks to produce a generally normal yellow color.

In accordance with the process of the invention, the amount of albumen added to the egg yolks in order to produce this egg product can be adjusted in order to achieve a desired color and also in order to achieve a desired taste.

Inasmuch as the yolk content in the egg product is substantially reduced, there is also a concomitantly reduced fat content. This also includes a reduction in the cholesterol fats including both the low density cholesterol and the high density cholesterol. The primarly purpose of the dilution is to reduce fat content and thus, reduction of the amount of yolk in a product by dilution is based on a target desired fat content. Accordingly, one starts with an overly rich colored yolk and egg taste to be able to dilute back to a normal taste and color and desired fat content.

The mix of the egg yolk and the albumen is introduced into a homogenizing apparatus so that it is blended at a high rate of speed. The mixture of the egg yolk and albumen also may be allowed to sit at room temperature in order to enable bacterial action to strengthen the flavor of the egg. In this way, it is possible to add more albumen and further dilute that mixture to a normal taste and color. Thereafter, the product must be refrigerated or lypholized in order to prevent deterioration.

In accordance with the present invention, it can be observed that the low fat content egg is generated by purposely producing eggs of an overly strong color and overly strong taste, that is, a red-orange or red-yellow color and an egg taste much stronger than normal. Thereafter, the yolk is separated from the albumen and a substantial quantity of albumen is added to the yolks in order to dilute both the taste and the color, thereby also reducing the fat content of the egg product which is produced.

This invention possesses many other advantages and has other purposes which may be made more clearly apparent from a consideration of the forms in which it may be embodied. One or more of these forms are described in the following detailed description. However, it is to be understood that such detailed description is only set forth for purposes of illustrating the general principles of the invention and is not to be taken in a limiting sense.

BRIEF DESCRIPTION OF THE DRAWINGS

Figure 1:
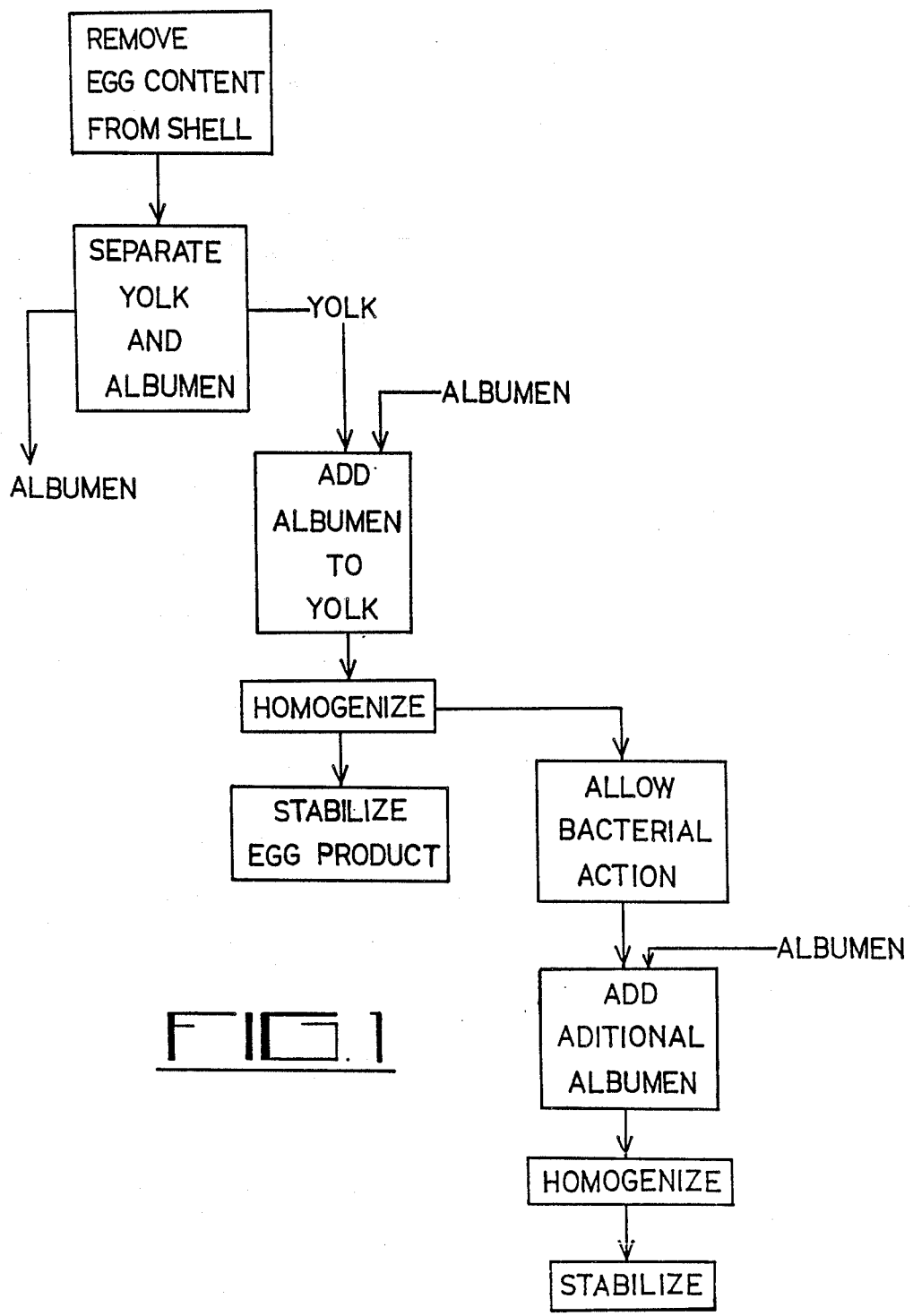

Having thus described the invention in general terms, reference will no be made to the accompanying drawing in which:

The FIGURE is a schematic representation illustrating the important steps in the process of the present invention.

DETAILED DESCRIPTION OF PREFERRED EMBODIMENTS

Referring now in more detail and by reference characters to the FIGURE, the process of the invention starts with producing eggs of a desired color and a desired taste. In this case, the color is an overly rich color, that is one which is much darker than the normal yellow color of an egg yolk, such that the color is a dark yellow having tones of gray or a strong yellow-red color or a strong yellow-orange color. The taste of the egg is overly strong such that one would normally find an egg of this taste to be relatively unpalatable.

The color of the egg is achieved by regulating the feed to the chickens which produce the eggs. In this case, the feed which is given to the chickens for producing the eggs of the richer color and taste may contain a blend of normal chicken feed with added pigment producing agents. The ingredients added to produce an overly rich colored egg and overly rich tasting egg are well known in the art and are therefore neither illustrated nor described in any further detail herein.

An extract of marigold meal flour, containing a large amount of xanthaphyl may be used. Chlorophyl may also be added to the feed in order to generate the overly rich color and overly rich taste. Glutenmeal is another well known product for imparting a darker color and stronger egg taste to the yolk of an egg. In many of the cases, carotene is the basic pigment which provides the darker color when added to the feed. Thus, additional amounts of carotene may be added to the chicken feed. However, other pigment controlling agents, such as canthaxanthin, may be used.

There is no specific dietary plan for feeding this modified feed to the chickens. Generally, the chicken farms will add the pigment to the feed and after a period of time, when the pigment has been assimilated by the chickens, the color of the yolk will begin to turn darker. Thus, by constantly monitoring the color of the yolk with respect to the feed given to chickens, the chicken farm is able to determine the desirable pigment ratio in the feed in order to obtain a desired pigment color in the yolk of the eggs. However, and as indicated above, inasmuch as the additional pigments for producing darker colored yolks and darker colored eggs is well known, there is some statistical data available for providing approximate amounts of feed in order to obtain a desired color content of the egg yolk.

In a normal retail in-shell egg which meets U.S.D.A. standards, the color may vary from egg to egg. However, there is a normal color range expected by the consumer and which is generally a bright yellow color of yolk and which also renders a yellow color to the egg when mixed. The preferred color range is about 0.8 or 0.9 to about 1.5 on the Nepa scale. The Nepa scale is a well known scale for quantifying the color of an egg yolk or of a whole egg. The Nepa scale is based on the amount of beta carotene in an equivalent per-gram ratio of egg yolk or whole egg. As the darkness of the yolk or of the whole egg increases, the number index on the Nepa scale proportionately increases. See the May, 1960 issue of "Poultry Processing and Marketing."

For the purposes of the present invention, the beta carotene equivalents per-gram of egg yolk or whole egg is based on the following table.

TABLE I

| NEPA COLOR NO. | YOLKS | WHOLE EGGS | YOLK SOLIDS | WHOLE EGG SOLIDS |
| --- | --- | --- | --- | --- |
| 1 | 8–30 | 4–15 | 17–65 | 15–16 |
| 2 | 28–51 | 14–25 | 60–111 | 52–95 |
| 3 | 47–71 | 23–35 | 103–154 | 87–132 |
| 4 | 66–90 | 33–45 | 143–196 | 112–166 |
| 5 | 84–112 | 42–56 | 182–243 | 156–207 |

In order to produce the low fat content egg product of the present invention, it is preferable to start out with an egg yolk having a minimum of a 3.5 Nepa scale value and preferably a 4 to 4.5 Nepa scale value. The egg yolk is then diluted by the addition of albumen to reach a Nepa scale value of about 0.8 or 0.9 to about 1.5 in the egg product. Nepa scale values for the final egg product in the range of about 0.4 to about 2.0 have also been found to be acceptable.

There is no definitive quantitative measurement for the taste of an egg in the same manner as there is for the color of an egg or egg yolk. However, it is well established that the darker color eggs may often impart a stronger egg taste, much in the same manner that certain fish are known to have a "fishier taste" than other fish. While there is yet to be a precise quantitative measurement, this is nevertheless an established fact. Several articles have been written about the taste imparted by eggs to various food products such as pastry products. See, for example, pages 73–375 of Science and Technology, Third Edition, by William J. Stadelman et al. 1886, AVI Publishing Company, Inc. of Westport, Conn.

An extensive review of the volatile constituents of egg and egg products was compiled and it was found that both saturated and unsaturated hydrocarbons as well as phenols, indoles, pyrroles, pyrazines, and sulfides were listed as affecting the taste. Dimethyl sulfide and dimethy trisulfide, although occurring in small amounts, were credited to contributing to the characteristic egg flavor. However, no one compound was determined as being responsible for the characteristic flavor of eggs. As a result, there is no effective quantification of taste characteristics of eggs.

It is also recognized that the taste of an in-shell egg may vary from egg to egg, even when U.S.D.A. approved and found in a retail establishment where the in-shell eggs may be purchsed for consumption. However, it is generally recognized that there is a certain taste normally associated with a normal egg of this type. Thus, the term "normal egg" refers to an in-shell egg which may be U.S.D.A. approved and found in a retail establishment for consumption by the general public. More specifically, the taste associated with that egg typically is the taste generally found with an egg having a Nepa scale color value of about 0.8 or 0.9 to about 1.5.

It is desirable to maintain a solids content approximately as high as that available in normal in-shell eggs suitable for consumers in retail establishments. However, some compromise is made on the solid content when diluting the egg with a substantial amount of albumen. However, the albumen itself, does have some solid content and therefore does add to the solid content of the total egg product even though a substantial portion of the yolk has been diluted.

It has been found in accordance with the present invention that it is possible to dilute the egg mixture, as previously described, to at least 50 percent of its original yolk content. Accordingly, inasmuch as substantially all fats are contained in the yolk, there is a reduction of at least 50 percent of the fats and for that matter the cholesterol. In many cases, by starting with egg yolks that have a fairly high Nepa value and a strong taste, it is possible to dilute the egg yolk with sufficient albumen to produce an egg product which has only 30 or 20 percent of the original amount of yolk present. Accordingly, the egg product will have only about 20 to 30 percent of the original amount of fat present in a normal egg and moreover will only have a corresponding reduction of about only 20 to 30 percent of the original cholesterol found in a normal egg.

In a normal in-shell egg, the percentage of the various nutrients and the units are shown for whole eggs, the white of the egg (albumen) and the yolk in the following table.

TABLE II

| Nutrients and Units | Whole | White | Yolk |
| --- | --- | --- | --- |
| Proximate | | | |
| Solids, g | 13.47 | 4.6 | 8.81 |
| Calories | 84 | 19 | 64 |
| Proteins (N × 6.25), g | 6.60 | 3.88 | 2.74 |
| Total lipids, g | 6.00 | — | 5.80 |
| Ash, g | 0.55 | .26 | 0.29 |
| Lipids | | | |
| Fatty acids, g | | | |
| Saturated, total | 2.01 | — | 1.95 |
| 8.0 | 0.027 | — | 0.027 |
| 10.0 | 0.082 | — | 0.080 |
| 12.0 | 0.027 | — | 0.026 |
| 14.0 | 0.022 | — | 0.022 |
| 16.0 | 1.37 | — | 1.31 |
| 18.0 | 0.462 | — | 0.459 |
| 20.0 | 0.022 | — | 0.022 |
| Monosaturated, total | 2.53 | — | 2.50 |
| 14.1 | 0.005 | — | 0.005 |
| 16.1 | 0.214 | — | 0.211 |
| 18.1 | 2.31 | — | 2.28 |
| Polyunsaturated, total | 0.73 | — | 0.72 |
| 18.2 | 0.660 | — | 0.650 |
| 18.3 | 0.011 | — | 0.014 |
| 20.4 | 0.055 | — | 0.051 |
| Cholesterol, g | 0.024 | — | 0.258 |
| Lechitin, g | 1.27 | — | 1.22 |
| Cephalin, g | 0.253 | — | 0.241 |

It can be observed that the vast portion of the fatty acids and various fats, as well as the cholesterol, is found in the yolk. Very little, if any at all of the fats or cholesterol is found in the white of the egg.

After a sufficient amount of the albumen has been added to the yolk of the egg in order to produce the desired cholesterol content and fat content, this blend is then introduced into a homogenizer. Any suitable homogenizing apparatus normally used in the egg process industry may be employed. Thus, inasmuch as these homogenizers are well known, they are neither illustrated nor described in any further detail herein.

After the blend has been completely homogenized, it is thereafter stabilized against degradation. Any suitable stabalizing technique may be employed. One of the stabalizing techniques employed in accordance with the present invention is to lypholize the egg product in conventional manner by removing all moisture content. Another stabilization technique is to refrigerate the egg product.

It is also possible in accordance with the present invention to allow the egg product to remain at room temperature or above for a period of time, that is, 70 degrees C or higher for a suitable period in order to permit some bacterial action. Generally, it has been found that a period of anywhere from 4 hours to about 24 hours may be sufficient for allowing the desired amount of bacterial action. Any time period less than four hours is usually insufficient to permit sufficient bacterial action and any period in excess of 24 hours usually results in degradation of the egg product to a point where it is unhealthy for consumption. Generally, when the egg product is stored at a room temperature of about 70 degrees F for a 12 to 14 hour period, the desired bacterial attack has been found to be quite suitable.

It has been found in accordance with the present invention, that by allowing the bacterial action, there is a resultant darkening of the color of the egg product as well as an increase in the egg taste of the egg product. Again, the amount of increase of the color and egg taste is dependent upon the amount of bacterial action which is allowed.

Thereafter, additional albumen may be added to the egg product in order to further dilute the egg product back to a Nepa value in a range as previously described and correspondingly dilute the egg product to the taste of a normal in-shell consumer available egg. Thereafter, the egg product is again homogenized and stabilized in the manner as previously described.

EXAMPLES

The invention is further illustrated by but not limited to the following examples:

EXAMPLE I

A normal corn feed having a small amount of a marigold flour extract was fed to a group of approximately 3,000 chickens for a period of two weeks. Thereafter, the eggs of the chickens were collected for testing. The eggs were broken in a Henningsams egg breaking machine and the yolks were automatically separated from the albumen. The yolk content of each of the eggs was collected and albumen was added to the yolk in an amount of about 50 percent by weight of albumen to about 50 percent by weight of yolk.

The albumen and yolk mixture was then introduced into a homogenizer for a period of about 20 minutes and the contents of the blend was thoroughly mixed to form the egg product. Thereafter, the egg product was refrigerated for testing shortly thereafter.

Analysis of the egg product revealed the following:

| | |
|---|---|
| Solid/Moisture | 17.11 |
| Color-Nepa Scale | 1.5 |
| Fat Content | 4.56 |
| pH | 6.39 |
| Cholesterol | 8.9 mg/100 g. |

EXAMPLE II

A normal corn feed having a small amount of a marigold flour extract was fed to a group of approximately 3,000 chickens for a period of two weeks. Thereafter, the eggs of the chickens were collected for testing. The eggs were broken in a Seymours egg breaking machine and the yolks were automatically separated from the albumen. The yolk content of each of the eggs was collected and albumen was added to the yolk in an amount of about 70 percent by weight of albumen to about 30 percent by weight of yolk.

The albumen and yolk mixture was then introduced into a homogenizer for a period of about 20 minutes and the contents of the blend was thoroughly mixed to form the egg product. The egg product was then refrigerated for testing shortly thereafter.

Analysis of the egg product revealed the following:

| | |
|---|---|
| Solid/Moisture | 15.52 |
| Color-Nepa Scale | 0.9 |
| Fat Content | 3.5 |
| pH | 6.58 |
| Cholesterol | 5.0 mg/100 g. |

Thus, there has been illustrated and described a unique and novel low fat content egg product and a process for producing same and which fulfills all of the objects and advantages which have been sought. It should be understood that many changes, modifications, variations and other uses and applications will become apparent to those skilled in the art after considering this specification and the accompanying drawings. Therefore, any and all such changes, modifications, variations, and other uses and application which do not depart from the spirit and scope of the invention and which may become apparent to those skilled in the art after considering this specification are deemed to be covered by the invention.

Having thus described the invention, what I desire to claim and secure by Letters Patent is:

1. A process fro producing a low fat content egg product, said process comprising:
    (a) producing eggs having an overly rich color which is darker than the normal egg color and an egg taste which is much stronger than a normal egg taste,
    (b) removing the egg contents from the shells of the eggs,
    (c) separating the egg yolks from the albumen,
    (d) adding albumen from the same eggs or other eggs to the egg yolks and forming a blend thereof and which albumen is added in an amount to dilute the color to that of a normal yellow color of a normally produced egg and to dilute the taste to that of a normal egg, the albumen also being added in an amount to dilute the fat content such that the egg product thus produced has a substantially lesser fat content than a normal egg, and
    (e) causing the egg product to remain in an environment of room temperature or greater than room temperature for a selected time to cause bacterial action on the egg product thereby further strengthening the taste and darkening the color, and
    (f) addding additional albumen to the bacterial affected blend to further dilute the color and the taste to that of a normal egg.

2. The process of claim 1 further characterized in that the process comprises homogenizing the blend.

3. The process of claim 2 further characterized in that the homogenized blend is stabilized.

4. The process of claim 3 further characterized in that the homogenized blend is stabilized by refrigerating same.

5. The process of claim 3 further characterized in that the homogenized blend is stabilized by lypholizing same.

6. The process of claim 1 further characterized in that the egg product is allowed to remain at room temperature or greater for a period of about 4 to about 24 hours.

7. A process for producing a low fat content egg product, said process comprising:
    (a) producing eggs having an overly rich color in the range of about 3.5 to about 4.5 on the Nepa scale and which has an egg taste which is much stronger than a normal egg taste,
    (b) removing the egg contents from the shells of the eggs,
    (c) separating the egg yolks from the albumen, and
    (d) adding albumen from the same eggs or other eggs to the egg yolks and forming a blend thereof and which albumen is added in an amount to dilute the color to that in a range of about 0.8 to about 1.5 on the Nepa scale and to dilute the taste to that of a normal egg, the albumen also being added in an amount to dilute the fat content such that the egg product thus produced has a substantially lesser fat content than a normal egg.

8. The process of claim 7 further characterized in that the process comprises homogenizing the blend.

9. The process of claim 8 further characterized in that the homogenized blend is stabilized.

10. The process of claim 9 further characterized in that the homogenized blend is stabilized by lypholizing same.

11. The process of claim 7 further characterized in that the egg product is allowed to remain in an environment of room temperature or greater than room temperature for a selected time to cause bacterial action on the egg product thereby further strengthening the taste and darkening the color, and the process thereafter comprises adding additional albumen to the bacterial affected blend to further dilute the color and the taste to that of a normal egg.

12. The process of claim 11 further characterized in that the egg product is allowed to remain at room temperature or greater for a period of about 4 to about 24 hours.

* * * * *